US012753816B2

(12) United States Patent
Zimmer et al.

(10) Patent No.: US 12,753,816 B2
(45) Date of Patent: Oct. 6, 2026

(54) BRAKING AND/OR CLAMPING DEVICE HAVING A PISTON-LOADABLE DISK ELEMENT

(71) Applicants: Martin Zimmer, Rheinau (DE); Günther Zimmer, Rheinau (DE)

(72) Inventors: Martin Zimmer, Rheinau (DE); Günther Zimmer, Rheinau (DE)

( * ) Notice: Subject to any disclaimer, the term of this patent is extended or adjusted under 35 U.S.C. 154(b) by 317 days.

(21) Appl. No.: 18/720,210

(22) PCT Filed: Dec. 7, 2022

(86) PCT No.: PCT/DE2022/000118
§ 371 (c)(1),
(2) Date: Jun. 14, 2024

(87) PCT Pub. No.: WO2023/109993
PCT Pub. Date: Jun. 22, 2023

(65) Prior Publication Data

US 2025/0052292 A1 Feb. 13, 2025

(30) Foreign Application Priority Data

Dec. 16, 2021 (DE) ..................... 10 2021 006 219.1

(51) Int. Cl.
*F16D 1/093* (2006.01)
*F16D 65/18* (2006.01)
*F16D 49/18* (2006.01)

(52) U.S. Cl.
CPC ........... *F16D 65/186* (2013.01); *F16D 1/093* (2013.01); *F16D 49/18* (2013.01)

(58) Field of Classification Search
CPC .... F16D 63/008; F16D 2121/06; F16D 1/093; F16D 1/096; B23Q 1/28
See application file for complete search history.

(56) References Cited

U.S. PATENT DOCUMENTS 3,450,242 A * 6/1969 Heidrich ............... F16D 65/813
192/85.13
3,626,506 A 12/1971 Spieth
(Continued)

FOREIGN PATENT DOCUMENTS

BE 903444 2/1986
DE 1625452 A1 1/1970
(Continued)

*Primary Examiner* — Bradley T King
(74) *Attorney, Agent, or Firm* — Smartpat PLC

(57) ABSTRACT

A braking and/or clamping device includes an annular housing which has a pneumatic or hydraulic connection and surrounds an axially oriented rod receptacle. The housing has a base part and a cover part. An annular pressure chamber is disposed within the housing. The pressure chamber is axially delimited by a piston which is movable in the axial direction. The pressure chamber is radially delimited by the outer walls of the housing and by an inner ring which surrounds an inner wall of the housing. The inner wall has an inner wall portion. In the housing, a disc element is disposed on the piston top face, which faces away from the pressure chamber and is axially oriented. The piston top face is seated against or fastened to the disc element. The inner wall portion is protrudingly located in a cover part or in a base part of the housing.

10 Claims, 11 Drawing Sheets

(56) References Cited

U.S. PATENT DOCUMENTS

| | | | | |
|---|---|---|---|---|
| 6,629,584 | B1 * | 10/2003 | Muller .................... | F16C 29/10<br>403/31 |
| 8,123,233 | B2 * | 2/2012 | Hofmann ................ | B25B 5/065<br>279/4.12 |
| 2006/0042892 | A1 | 3/2006 | Hofmann | |
| 2008/0217872 | A1 * | 9/2008 | Hofmann .............. | B23B 31/107<br>279/152 |
| 2010/0243383 | A1 | 9/2010 | Korischem et al. | |
| 2025/0243916 | A1 * | 7/2025 | Likus ...................... | F16D 55/12 |
| 2025/0262723 | A1 * | 8/2025 | Likus ................... | B23Q 16/107 |
| 2026/0108993 | A1 * | 4/2026 | Likus ................... | B23Q 1/0009 |

FOREIGN PATENT DOCUMENTS

| | | | |
|---|---|---|---|
| DE | 102009014117 | A1 | 10/2010 |
| GB | 1208555 | A | 10/1970 |
| WO | 2004067222 | A1 | 8/2004 |
| WO | 2008054294 | A1 | 5/2008 |

* cited by examiner

BRAKING AND/OR CLAMPING DEVICE HAVING A PISTON-LOADABLE DISK ELEMENT

CROSS-REFERENCE TO RELATED APPLICATION

This application is a national stage application, filed under 35 U.S.C. § 371, of International Patent Application PCT/DE2022/000118, filed on Dec. 7, 2022, which claims the benefit of German Patent Application DE 10 2021 006 219.1, filed on Dec. 16, 2021.

BACKGROUND

The disclosure relates to a braking and/or clamping device comprising an annular housing which has at least one pneumatic or hydraulic connection and surrounds a rod receptacle oriented in the axial direction, wherein the housing has a base part and a cover part and wherein at least one annular pressure chamber is disposed within the housing.

Such a braking and/or clamping device is known from WO 2004/067 222 A1. The pressure chamber is delimited by an annular hose. During clamping, a circumferential ring slotted in the longitudinal direction is deformed.

SUMMARY

The aim of the present disclosure is to develop a quickly responding braking and/or clamping device having a small stroke and high accuracy.

This aim is achieved by means of the features of the principal claim. To this end, the pressure chamber is delimited in the axial direction by means of at least one piston which has a bulged top face and is movable in the axial direction. The pressure chamber is delimited in the radial direction by means of the outer walls of the housing and by means of at least one inner ring which surrounds an inner wall of the housing, said inner wall having at least one inner wall portion. In the housing, a disc element is disposed on the piston top face, which faces away from the pressure chamber and is oriented in the axial direction, wherein the piston top face is or can be seated against or fastened to said disc element. The inner wall portion is respectively protrudingly located in a cover part or in a base part of the housing. The disc element is seated against in the inner wall portion so that the load on the inner wall portion, which is directed radially in the direction of a longitudinal axis of the braking and/or clamping device oriented in the axial direction, decreases with increasing deformation of the disc element.

The braking and/or clamping device is used to brake and/or clamp machine parts which are moving relative to one another, wherein the braking and/or clamping device grips a rod whose center line coincides with the longitudinal axis of the braking and/or clamping device, for example. In the depressurized state, the pressure chamber is at its minimum volume. The disc element or elements have their original shape. They place a load on the inner wall, the inner wall portions of which are deformed in the direction of the longitudinal axis. When the rod is inserted in the braking and/or clamping device, the inner wall portions are pressed against the rod in this clamping state.

Pneumatic or hydraulic pressure is applied to the pressure chamber to release the braking and/or clamping device. The pressure chamber is enlarged, wherein the at least one piston delimiting the pressure chamber is displaced. When the pressure chamber is pressurized, each piston exerts a load on at least one disc element and deforms it. Thereby the inner wall is unloaded. The self-resetting inner wall portions assume their unloaded initial position. The clamping of the rod is released or reduced.

DETAILED DESCRIPTION

Figure 1:
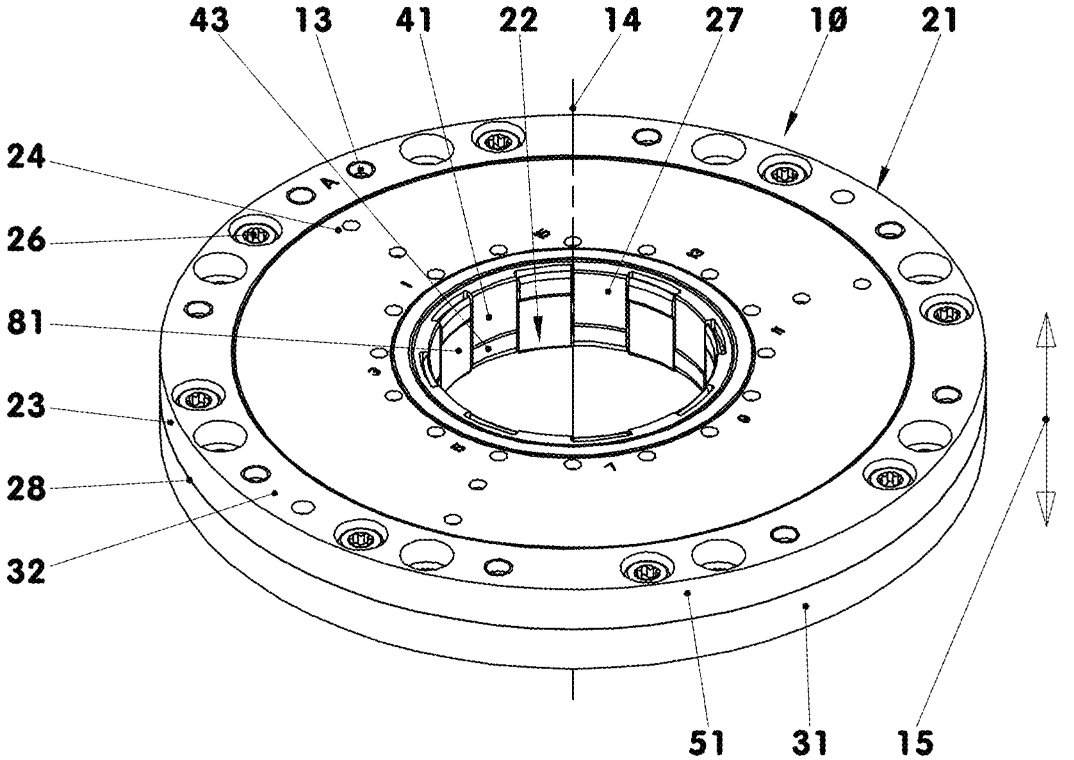
FIG. 1: Braking and/or clamping device.

FIGS. 1 to 9 show a braking and/or clamping device (10). Such devices (10) are used on machine tools, for example, in order to delay or fix machine tables relative to guide rods. The braking and/or clamping device (10) is movable or adjustable in the axial direction (15) along the guide rod. In the radial direction, the braking and/or clamping device (10) completely surrounds the guide rod, which is not shown here. The braking and/or clamping device (10) has two operating states. A first operating state is a released or disengaged position (11), see FIG. 9. In this released position (11), the braking and/or clamping device (10) is movable in its axial directions (15) relative to the guide rod, for example. The other operating state is a clamping position (12), see FIG. 8. In this clamping position (12), the braking and/or clamping device (10) is seated radially against the guide rod for braking and/or locking.

The braking and/or clamping device (10) has an e.g. annular, flat housing (21) with, for example, a central rod receptacle (22). The circular, for example, cross-sectional face of the rod receptacle (22) is normally oriented to the central longitudinal axis (14) of the braking and/or clamping device (10), which axis is oriented in the axial direction (15). This longitudinal axis (14) coincides with the centerline of the rod receptacle (22). The jacket surface (23) of the housing (21) is formed coaxially with the rod receptacle (22), for example.

In the exemplary embodiment, the rod receptacle (22) has a nominal diameter of 50 millimeters. This nominal diameter corresponds to the outside diameter of the guide rod which can be received in the rod receptacle (22). The diameter of the rod receptacle (22) is 0.06% larger, for example, than the nominal diameter when the braking and/or clamping device (10) is released. In the clamping position (12)—when the guide rod is not inserted—the diameter can be reduced to 96% of the nominal diameter, for example.

In the exemplary embodiment, the outside diameter of the braking and/or clamping device (10) is 2.9 times the nominal diameter. The length of the braking and/or clamping device (10) oriented in the axial direction (15) is, for example, 34% of the nominal diameter. The length of the braking and/or clamping device (10) is thus less than 50% of the nominal diameter of the rod receptacle (22).

In the exemplary embodiment, the housing (21) has a pneumatic connection (13) both on its top face (24) and on its bottom face (25). One of these connections (13) can be closed by means of a blind plug. It is also conceivable to provide two connections on the top face (24) and/or the bottom face (25). One or more connections can also be provided on the jacket surface (23) of the braking and/or clamping device (10). In the exemplary embodiment, the pneumatic connection (13) sits in the edge area (32) of a cover part (31) of the housing (21). Instead of the at least one pneumatic connection (13), at least one hydraulic connection can also be provided in the housing (21).

The housing (21) comprises a base part (51) and the cover part (31) joined with it. In the exemplary embodiment, the two parts (31, 51) are screwed together. For this purpose, connecting screws (26) are inserted in both the cover part (31) and the base part (51) and screwed into threads (53; 33) in the corresponding other part (51; 31). However, the two parts (31, 51) can also be connected to one another by a material connection, for example by means of a welded connection, or by a force-fitting and/or form-fitting connection, such as by means of a screw connection or by means of locking elements. Here, the connecting screws (26) are respectively disposed in the edge area (32).

In the exemplary embodiment, the inner wall (27) of the housing (21) delimiting the rod recess (22) is formed from the envelope contour of 16 inner wall portions (41, 81). In this exemplary embodiment, the inner wall portions (41, 81) are formed as clamping contact plates (41, 81). One half of these clamping contact plates (41, 81) is disposed on the base part (51) and protrudes in the direction of the cover part (31). These clamping contact plates (81) are referred to below as first clamping contact plates (81). The other half of the contact plates (41, 81) is disposed on the cover part (31) and protrudes in the direction of the base part (51). These clamping contact plates (41) are referred to below as second clamping contact plates (41). The individual clamping contact plate (41; 81) has a clamping contact zone (43; 83) at its free end (42, 82). This is oriented radially in the direction of the longitudinal axis (14), for example.

In the exemplary embodiment, all inner wall portions (41; 81) are formed identically and are disposed along a common partial circle lying, for example, in the plane of the separating joint (28) of the housing (21). In the exemplary embodiment, they are each disposed along an annular line. They have the same geometric dimensions. However, it is also conceivable to form individual inner wall portions (41; 81) or groups of inner wall portions (41; 81), for example, with a different width oriented in the circumferential direction. For example, the individual inner wall portion (41; 81) can be formed like a pin.

The clamping contact jaws (41; 81) shown in FIG. 1 are evenly spaced apart. The distance between the individual clamping contact plates (41; 81) can also be formed in different ways.

Figure 2:
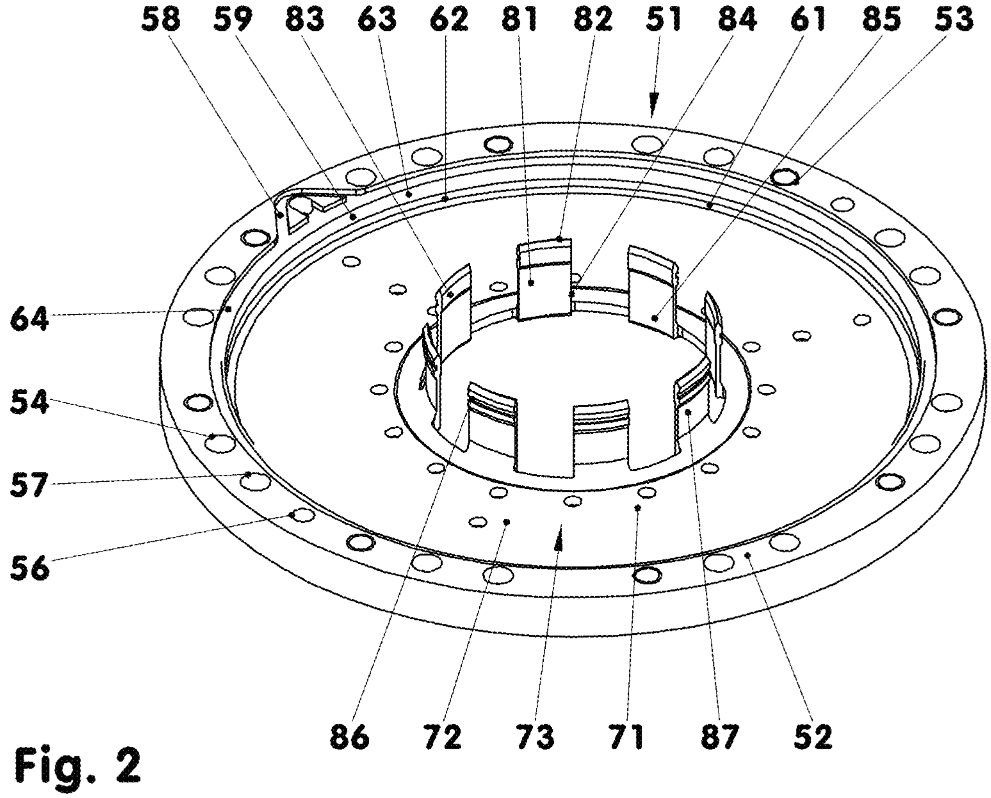
FIG. 2: Base part.

FIG. 2 shows the base part (51). The base part (51) has a rigid outer wall (52), a base (71) and the first clamping contact plates (81). The outer wall (52) is penetrated in the axial direction (15) by through bores (54) and threaded bores (53) for the connecting screws (26). Furthermore, centering bolt receptacles (56) and mounting bores (57) are provided in the outer wall (52). A distribution channel (58) and an inlet area (64) are embossed into the outer wall (52). By means of this distribution channel (58) and the inlet area (64), compressed air, for example, is fed from the pneumatic connection (13) into a pressure chamber (16) of the braking and/or clamping device (10).

The outer wall (52) is formed in the shape of a cylindrical jacket. Its inner side (59) has a multi-step design. Adjacent to the base (71), it has a disc receiving area (61) which is disposed coaxially with the longitudinal axis (14). This adjoins a transition area (62). In the illustrations in FIGS. 2, 8 and 9, an outer piston guide area (63) is formed above the transition area (62). The outer piston guide area (63) is formed cylindrically coaxial with the longitudinal axis (14). The inlet area (64) adjoins the outer piston guide area (63) at the upper edge of the outer wall (52).

The base (71) is formed in an annular shape. It has a central circulating trough (72), see FIGS. 8 and 9. In the exemplary embodiment, the width of the circulating trough (72) corresponds to 82% of the distance between the clamping contact plates (81) and the outer wall (52). The curvature centerline, for example, lies at half the distance mentioned above. The base (71) can also be formed curved or flat on half of its inner side (73). In the case of a one-sided curvature, this can lie outside or inside a cylinder coaxial with the longitudinal axis (14) to the curvature centerline.

In the exemplary embodiment, each individual first clamping contact plate (81) respectively covers one ring section of 22 degrees. They are connected to the base (71) of the base part (51). Each individual clamping contact plate (81) has a clamping arm (84) with, for example, a largely constant cross-sectional surface. The outer radius of the clamping arm (84) is 3% larger than the inner radius, for example. The clamping arm (84) can also have a rectangular cross-sectional surface, for example, in some areas. The individual clamping arm (84) can also be formed in a tapered manner in relation to the rest of the clamping contact plate (81). If necessary, the individual clamping contact plate (81) may have a longitudinal notch on its inner side (85) oriented parallel to the longitudinal direction (14).

The clamping contact zone (83) is formed on the inner side (85) of the individual clamping contact plate (81), said inner side oriented towards the longitudinal axis (14). This is formed, for example, raised by a tenth of a millimeter in the direction of the longitudinal axis (14). In the exemplary embodiment, the sum of the contact surfaces of all clamping contact zones (43, 83) of the first contact plates (81) and the second clamping contact plates (41) is greater than 20% of the cross-sectional surface of the nominal diameter. In the exemplary embodiment, the sum of all contact surfaces is 25% of the cross-sectional surface of the nominal diameter. The clamping contact zones (43, 83) can have a coating, e.g., a brake or friction lining.

For example, an insertion groove (86) is embossed on the outer side of each of the clamping contact plates (81). This insertion groove (86) runs in the circumferential direction. In the exemplary embodiment, it has a constant depth and a constant length oriented in the axial direction (15). The insertion groove (86) of, for example, a clamping contact plate (81) can have a centering web oriented, for example, in the longitudinal direction.

Figure 3:
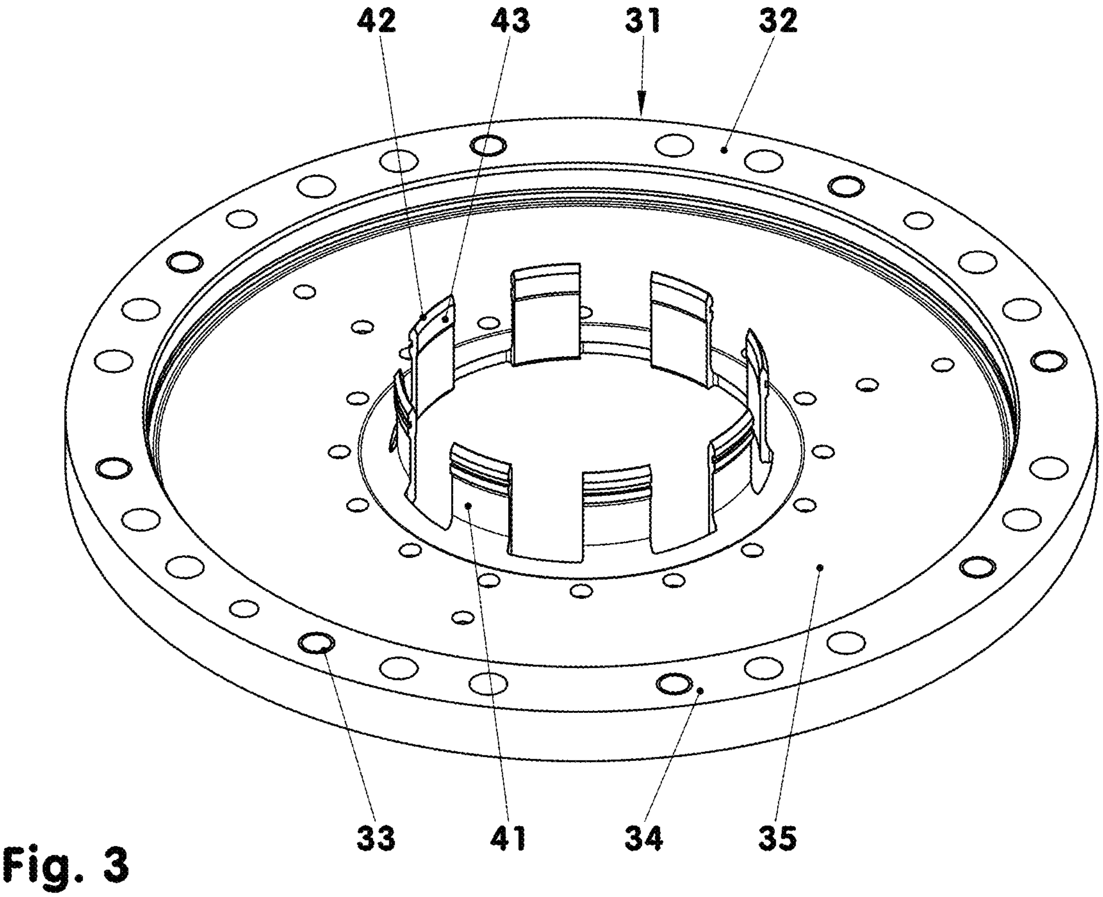
FIG. 3: Cover part

FIG. 3 shows a cover part (31). The cover part (31) has a similar design to the base part (51). For example, the base part (51) and the cover part (31) have the same external dimensions. In the exemplary embodiment, the outer wall (34) of the cover part (31) is formed without a distribution channel (58) and without an inlet area (64). The cover part (31) carries the second clamping contact plates (41) in its area adjacent to the rod recess (22). These second clamping contact plates (41) are connected to the cover (35) of the cover part (31). In this illustration, they protrude in an axial direction (15). When the clamping and/or braking device (10) is installed, they protrude in the direction of the base part (51).

Figure 4:
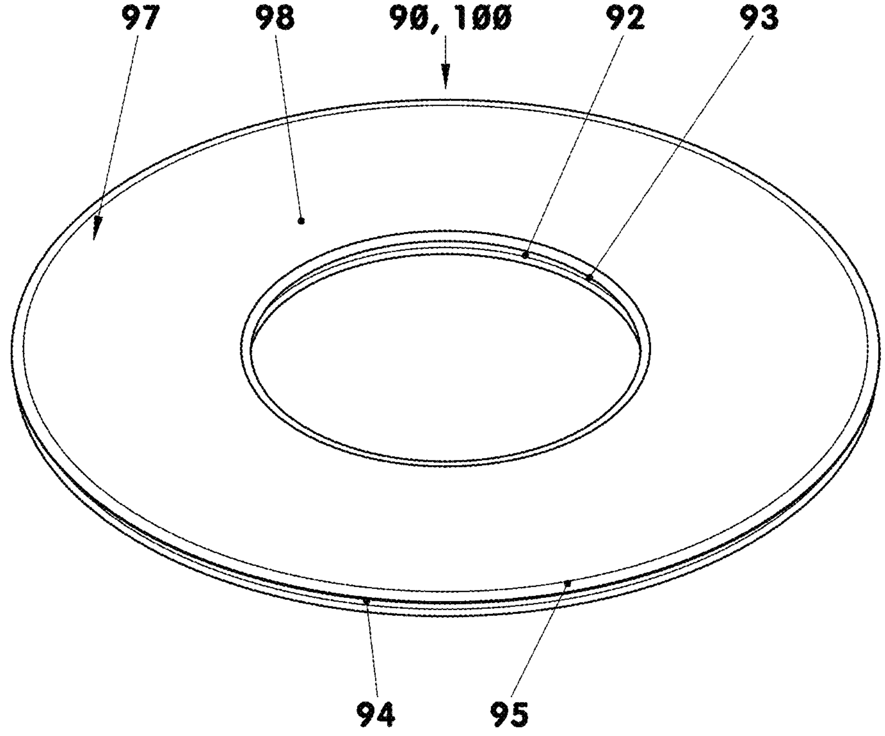
FIG. 4: Piston.

FIG. 4 shows a piston (90; 100). The braking and/or clamping device (10) of this exemplary embodiment has two pistons (90; 100), the respective bottom faces (91; 101) of which are oriented towards one another, see FIGS. 8 and 9. Both pistons (90, 100) are formed identically in the exemplary embodiment. The individual piston (90; 100) is an annular piston (90; 100). Its outside diameter is 2.25 times its inside diameter, for example. The inside diameter is 9.6% larger than the nominal diameter of the braking and/or clamping device (10), for example. This inside diameter of the annular piston (90; 100) is at least 5% larger than the nominal diameter of the braking and/or clamping device (10). The inner surface (92) formed coaxially with the longitudinal axis (14) has an annular groove (93) for receiving a sealing ring (108), see FIG. 8. A further sealing ring groove (94) for receiving an outer sealing ring (109) is embossed in the jacket surface (95) of the annular piston (90; 100).

The piston bottom face (91; 101) has a circumferential ring (96). This has a length of one tenth of a millimeter in the axial direction (15) and a width of 2.5 millimeters in the radial direction, for example.

The piston top face (97) has a circumferential projection (98) formed as a bulge. In the exemplary embodiment, the bulging radius of the projection (98) is 2.4 times the nominal diameter of the braking and/or clamping device (10). The bulge centerline lies on the center diameter of the annular piston (90; 100). In the exemplary embodiment, the apex (99) of the projection (98) is offset from its edges by 2% of the nominal diameter in the longitudinal direction (15). The projection (98) can also be formed as a circumferential web. It is disposed coaxially with the inner surface (92) of the piston (90; 100).

Figure 5:
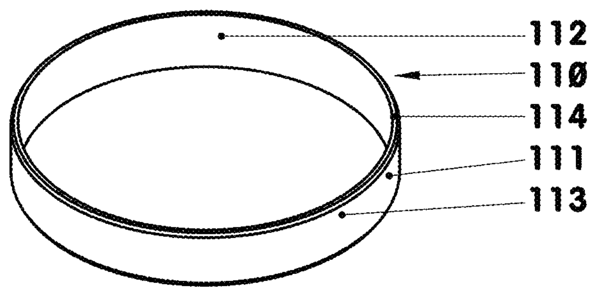
FIG. 5: Inner ring.

FIG. 5 shows an inner ring (110). The inner ring (110) of this exemplary embodiment has a constant cross-sectional profile. Its outer surface (111) which has the shape of a cylindrical jacket and its inner surface (112) are formed coaxially with the longitudinal axis (14). In the exemplary embodiment, the inside diameter of the inner ring (110) is 5% larger than the nominal diameter of the braking and/or clamping device (10). In the exemplary embodiment, the outside diameter is 9.2% larger than the nominal diameter. The length of the inner ring (110) in the axial direction (15) is, for example, 18% of the nominal diameter. When the braking and/or clamping device (10) is installed, the inner ring (110) surrounds the inner wall (27). For example, it is mounted in a floating manner within the housing (21) in the axial directions (15).

Figure 6:
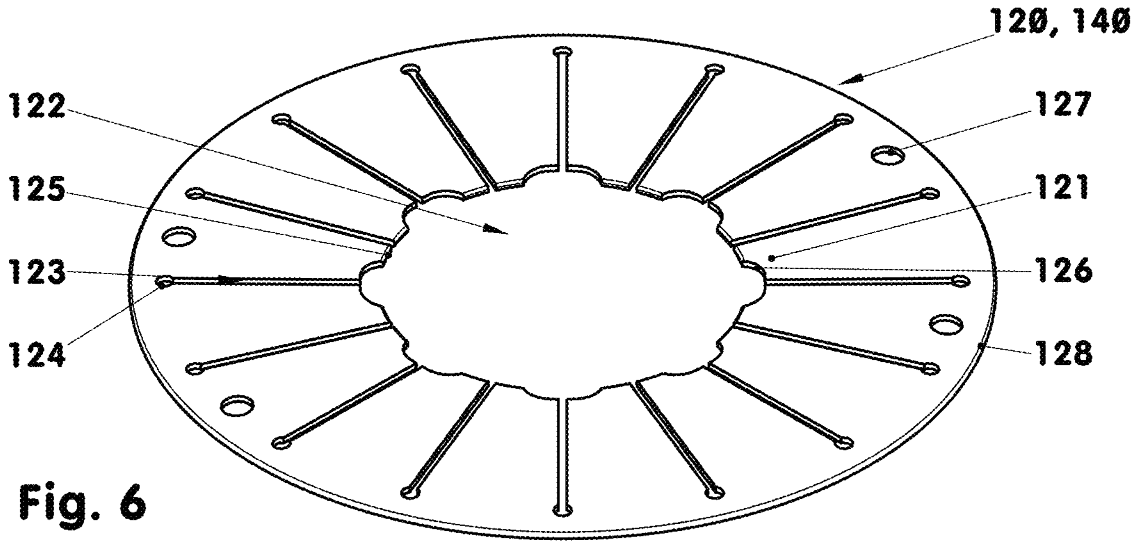
FIG. 6: Disc element.
Figure 7:
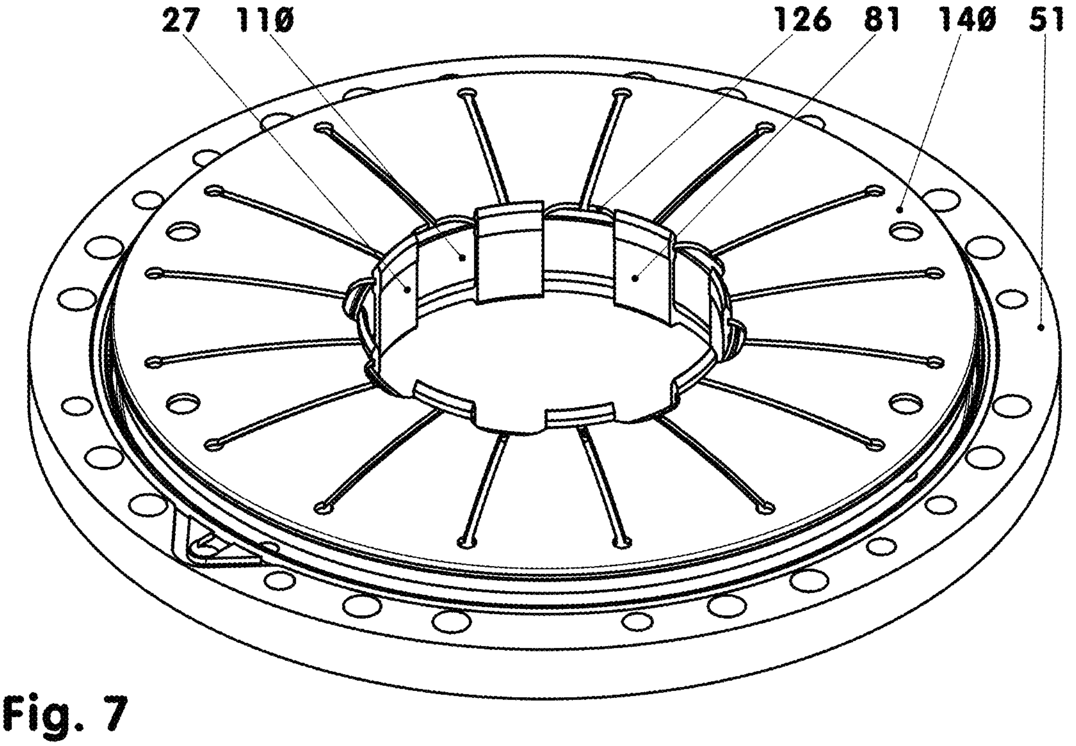
FIG. 7: Device from FIG. 1 with cover part removed.

FIG. 6 shows a disc element (120; 140). The braking and/or clamping device (10) disclosed in this exemplary embodiment has at least two disc elements (120; 140). A first disc element (120) is mounted in the base part (51) between the base (71) and the first annular piston (90). The second disc element (140) lies in the cover part (31) between the second annular piston (100) and the cover (35). Both disc elements (120, 140) are formed identically. In the exemplary embodiment, both disc elements (120, 140) are plane-parallel, flat discs in the non-assembled state. The individual disc element (120, 140) can be bulged like a plate spring. It is also conceivable to dispose a plurality of disc elements (120, 140) on top of one another.

In the exemplary embodiment, the outside diameter of the annularly formed, for example, disc element (120, 140) is 2.44 times the nominal diameter of the braking and/or clamping device (10). The inside diameter of the disc element (120, 140) is, for example, 3.5% larger than the nominal diameter. The thickness of the disc element (120, 140) is, for example, 1.8% of the nominal diameter of the braking and/or clamping device (10). The individual disc element (120, 140) can also be formed in the shape of a strip. It then has, for example, two opposite circular circumferential sections and a central opening (122). The individual disc element (120, 140) is produced from a metallic material, such as steel, spring steel, aluminum, etc.

The individual disc element (120; 140) has a plurality of disc segments (121). In the exemplary embodiment, the number of disc segments (121) of a disc element (120; 140) is twice the number of first clamping contact plates (81) or twice the number of second clamping contact plates (41). The individual disc segments (121) are respectively separated from one another by a slot (123) adjacent to the central opening (122). Each individual slot (123), for example, has a length of 62.5% of the nominal diameter and a width of 2.4% of the nominal diameter. Each individual slot (123) ends in a relief bore (124).

Each disc segment (121) has a segment pressure zone (125) adjacent to the central opening (122) and a free surface (126) spaced from the envelope contour of the central opening (122). In the exemplary embodiment, the length of the segment pressure zone (125) in the circumferential direction is less than half the intended sector arc length of the disc segment (121) at the central opening (122). This arc length is shorter than half the distance between two adjacent slots (123). The free surface (126) is delimited, for example, by a quarter ellipse. The individual disc segments (121) are disposed in such a way that two segment pressure zones (125) and two free surfaces (126) lie respectively next to one another. Further openings (127) are disposed in the outer area of the disc elements (120; 140).

In the assembled braking and/or clamping device (10), the first disc element (120) lies with its outer circumferential surface (128) in the disc receiving area (61) of the outer wall (52) of the base part (51). The segment pressure zones (125) sit in the insertion grooves (86) of the second clamping contact plates (41). In each case, two segment pressure zones (125) are seated against a clamping contact plate (41). The radial position of the disc element (120) is centered relative to the second clamping contact plates (41), for example, by such means as a centering web disposed in an insertion groove (86). The respective free surfaces (126) lie outside the first clamping contact plates (41) so that they do not touch them.

The second disc element (140) is disposed analogously thereto in the cover part (31). In this case, the segment pressure zones (125) of the second disc element (140) are seated against the first clamping contact plates (81).

The inner ring (110), the outer walls (34, 52) of the housing (21) and the two pistons (90, 100) delimit a pressure chamber (16). This pressure chamber (16) is connected to the hydraulic or pneumatic connection (13). The two pistons (90, 100) are each sealed by means of the sealing rings (108) on the inner ring (110) and by means of the sealing rings (109) on the outer walls (34, 52).

Figure 8:
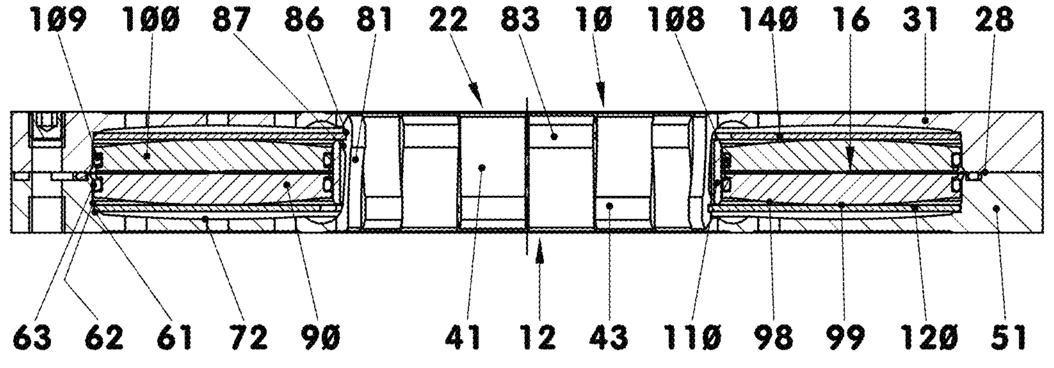
FIG. 8: Device according to FIG. 1 in clamping state.

When the pressure chamber (16) is not pressurized, the braking and/or clamping device (10) assumes the clamping position (12) shown in FIG. 8. The pistons (90, 100) are positioned at a small distance from one another near the separating joint (28) between the base part (51) and the cover part (31). The two pistons (90, 100) are seated against one another with the circumferential rings (96), for example. The pressure chamber (16) is at its minimum volume. The disc elements (120, 140) in their flat initial position, for example, are seated against the projections (98) of the pistons (90, 100). In this position, the disc elements (120, 140) exert a load on the clamping contact plates (41, 81). The clamping contact plates (41, 81) are elastically deformed in the direction of the longitudinal axis (14) by means of the disc elements (120, 140). The clamping arms (84) form a bending zone of the clamping contact plates (41, 81), for example. This bending zone can also be limited to a defined area of the clamping arms (84), for example to an area of reduced cross-sectional surface. It is also conceivable to design the bending zone like a joint.

In this clamping position (12), both the first clamping contact plates (81) and the second clamping contact plates (41) protrude into the rod receptacle (22) by the same amount, for example. A rod gripped by the braking and/or clamping device (10) is thus gripped in a stabilizing manner. The clamping contact zones (43, 83) are seated against the rod over a large surface. The position of the braking and/or clamping device (10) relative to the rod can thus be maintained with high accuracy. The first and second clamping contact plates (41, 81) enable a high clamping force.

Figure 9:
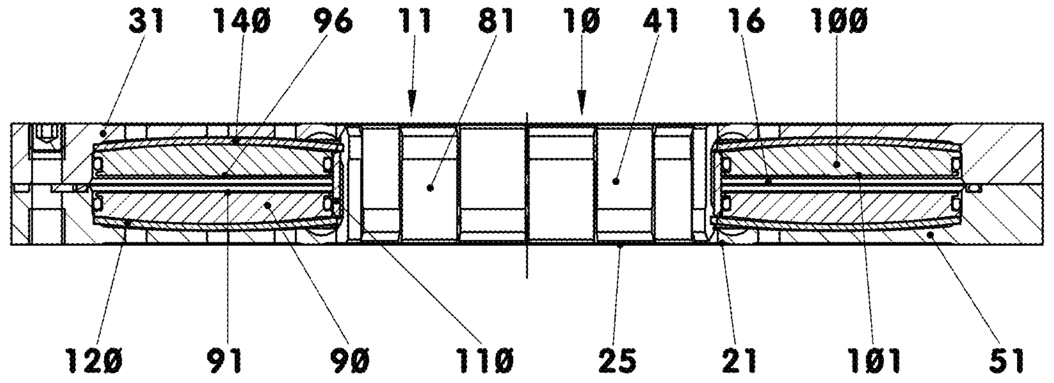
FIG. 9: Device according to FIG. 1 in released state.

To move the braking and/or clamping device (10) relative to the rod, the braking and/or clamping device (10) is released, see FIG. 9. For this purpose, compressed air is fed into the pressure chamber (16) via the pneumatic connection (13), for example. The two pistons (90, 100) are pushed apart. The pressure chamber (16) increases in size. The stroke of the individual piston (90; 100) in the axial direction (15) is, for example, 2% of the nominal diameter. The first piston (90) displaced in the direction of the base (71) places a load on the first disc element (120) with its projection (98). The first disc element (120) is held both at the disc receiving area (61) of the outer wall (52) and in the insertion grooves (86) of the clamping contact plates (41). Similarly, the second disc element (140) is held in the cover part (31) and at the first clamping contact plates (81). The loading of the individual disc element (120, 140) by means of the piston (90, 100) leads to an elastic deformation of the disc element (120, 140). The disc element (120, 140) nestles against the projection (98) at least in the area of the apex (99). The segment pressure zones (125) move radially outwards. The radial stroke of the segment pressure zones (125) is, for example, 1.6% of the nominal diameter. The clamping contact plates (41, 81) are unloaded. As the deformation of the individual disc element (120; 140) increases, the load on the respectively assigned clamping contact plate (41; 81) decreases. Under elastic re-deformation, they assume their initial position shown in FIGS. 2 and 3. The braking and/or clamping device (10) is released.

FIG. 9 shows the braking and/or clamping device (10) in the released position (11). The pressure chamber (16) is at its maximum volume. The pistons (90, 100) also delimit the pressure chamber (16) in this released position (11). The first piston (90) is in its lower end position. The first disc element (120) is bulged in the direction of the base (71). The second piston (100) is in its upper end position. The second disc element (140) is deformed in the direction of the cover (35). When the disc element (41; 81) is under load, the respectively assigned inner wall portions (41; 81) are unloaded. A rod seated in the rod receptacle (22) is freely displaceable, for example, when the braking and/or clamping device (10) is released.

The pneumatic pressure, for example, in the pressure chamber (16) is reduced for braking and/or clamping again. To this end, the internal pressure of the pressure chamber (16) can be adjusted to the ambient pressure by means of a release valve. It is also conceivable to reduce the pressure in the pressure chamber (16) by means of a suction pump, for example. The respective disc element (120; 140) can be fixed to the assigned piston (90; 100), for example. The disc element (120; 140) and the piston (90; 100) can also be pressurized from the side facing away from the pressure chamber (16). The two pistons (90, 100) respectively move towards one another in the axial direction (15).

The two disc elements (120, 140) are unloaded. They deform elastically back to their initial flat, for example, position. Here, the disc elements (120, 140) displace the respective clamping contact plates (41, 81) in the direction of the clamping position (12) shown in FIG. 8. As the deformation of the individual disc element (120; 140) decreases, the deformation of the assigned inner wall portions (41; 81) increases. The clamping stroke of the individual clamping contact plate (41; 81) in the area of the clamping contact zone (43; 83) corresponds, for example, to the radial stroke of the segment pressure zones (125). The re-deformation of the disc elements (120, 140) and the elastic deformation of the clamping contact plates (41, 81) take place, for example, at the same time as the pistons (90, 100) are moved. The braking and/or clamping device (10) thus reacts directly to a change in pressure in the pressure chamber (16). In the assembled state, the inner wall portions (41; 81) are pressed against the rod when the disc element is unloaded (120; 140).

Figure 10:
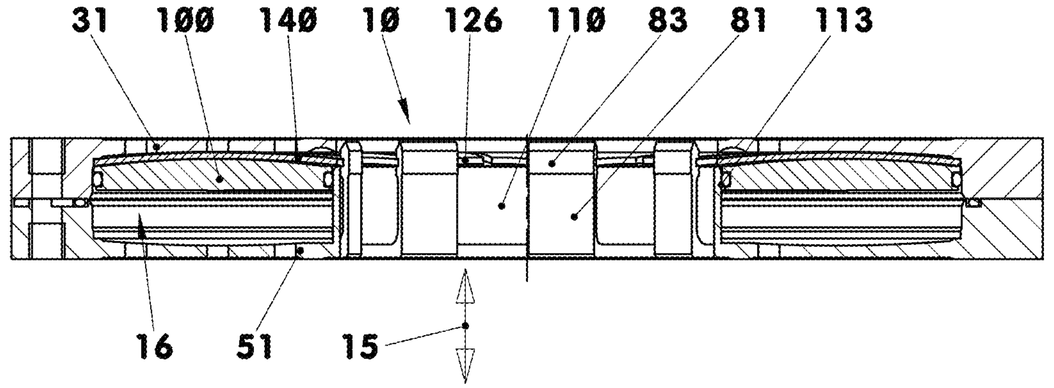
FIG. 10: Braking and/or clamping device having a piston.

FIG. 10 shows a sectional view of a variant of a braking and/or clamping device (10). This braking and/or clamping device (10) has, for example, the same nominal diameter of the rod receptacle (22) and the same external dimensions as the braking and/or clamping device (10) described in the previous exemplary embodiment.

In this exemplary embodiment, the base part (51) is formed similarly to the base part (51) shown in FIG. 2. In the illustration in FIG. 10, the inner ring (110) is molded onto the base part (51). However, the inner ring (110) can also be mounted in a floating manner in the axial direction (15) in this exemplary embodiment. It can also be screwed to the base section (51). The inside diameter and the outside diameter of this inner ring (110) correspond to the dimensions of the inner ring (110) shown in FIG. 5. If necessary, the inner ring (110) can be formed thicker in the area of the base (71) than in the piston guide area (113). The inner ring (110) then forms a stroke stop, for example.

The clamping contact plates (81) disposed on the base part (51) are formed as described above. Instead of, for example, the eight clamping contact plates (81) of the first exemplary embodiment, this braking and/or clamping device (10) can have at least two clamping contact plates (81) disposed on the base part (51).

The cover part (31) is formed similarly to the cover part (31) shown in FIG. 3. However, it has no clamping contact plates (41) in the illustration in FIG. 10. In this exemplary embodiment, rigid tongues can be disposed at the locations of the clamping contact plates (41) on the cover side.

A piston (100) is mounted displaceably in the axial directions (15) in the cover part (31). This piston (100) is formed in the same way as the piston (100) shown in FIG. 4. The disc element (140) used in this exemplary embodiment corresponds, for example, to the disc element (140) shown in FIG. 6.

During assembly, for example, the at least one disc element (140) is first inserted into the cover part (31). If necessary, the disc element (140) can be fixed to prevent it from turning. The piston (100) provided with the sealing elements (108, 109) is then inserted into the cover part (31) in such a way that the projection (98) is oriented towards the disc element (140). The base part (51) and the inner ring (110) are then inserted, for example, in such a way that the segment pressure zones (125) lie between the clamping contact plates (81). After the base part (51) is placed in position, it is pivoted relative to the disc element (140) by, for example, half a pitch of the clamping contact plates (81) about the longitudinal axis (14). The segment pressure zones (125) now lie behind the clamping contact plates (81). The free surfaces (126) lie between the clamping contact plates (81). The base part (51) and the cover part (31) can now be joined together. A different assembly sequence is also conceivable.

When the piston (100) is unloaded, the disc element (140) mounted in the cover part (31) places a load on the clamping contact plates (81) disposed in the base part (51) radially in the direction of the longitudinal axis (14). In this case, the piston (100) can be seated against a stroke stop. The braking and/or clamping device (10) can delay the relative movement of a rod or fix the rod relative to the braking and/or clamping device (10).

To release the braking and/or clamping device (10), the piston (100) is moved in the direction of the disc element (140) by such means as compressed air. The disc element (140) is elastically deformed and unloads the clamping contact plates (81). The self-resetting clamping contact plates (81) assume their unloaded initial position.

The braking and/or clamping device (10) shown in FIG. 10 can also be formed with clamping contact plates (41) disposed in the cover part (31). The piston (90) and the disc element (120) are then mounted in the base part (51).

In the exemplary embodiments shown, the inner wall portions (81) on the base part side are parts of the base part (51) and the inner wall portions (41) on the cover part side are parts of the cover part (31). However, it is also conceivable to mount the inner wall portions (41; 81) in spring-loaded joints on the base part (51) and/or on the cover part (31), for example. The joint spring, which unloads itself when the disc element (120; 140) or the disc elements (120, 140) are loaded by means of the piston or pistons (90, 100), then returns the inner wall portions (41, 81) to the unloaded initial position.

FIGS. 11 to 18 show a further example of a braking and/or clamping device (10). The nominal diameter of the rod receptacle (22) and the outer dimensions correspond, for example, to the braking and/or clamping devices (10) described in connection with the preceding exemplary embodiments.

In this embodiment, as well, the housing (21) of the braking and/or clamping device (10) has a base part (51) and a cover part (31) joined to the base part (51). Here, the base part (51) comprises the first inner wall portions (81). In this exemplary embodiment as well, the first inner wall portions (81) are formed as clamping contact plates (81). Openings (75) are disposed in the base (71) in the area of the first clamping contact plates (81). These lie in the area where the individual clamping contact plate (81) is connected to the base (71), for example. The individual clamping contact plate (81) has no insertion groove (86) on its outer side (87).

The cover part (31) comprises the second inner wall portions (41) formed as clamping contact plates (41). The cover part (31) also has openings (36). These are disposed in the area where the second clamping contact plates (41) are connected to the cover (35).

The individual piston (90; 100) is formed in the same way as the piston (90; 100) shown in FIG. 4. In this exemplary embodiment, its inside diameter is 25% larger than the nominal diameter.

Figure 14:
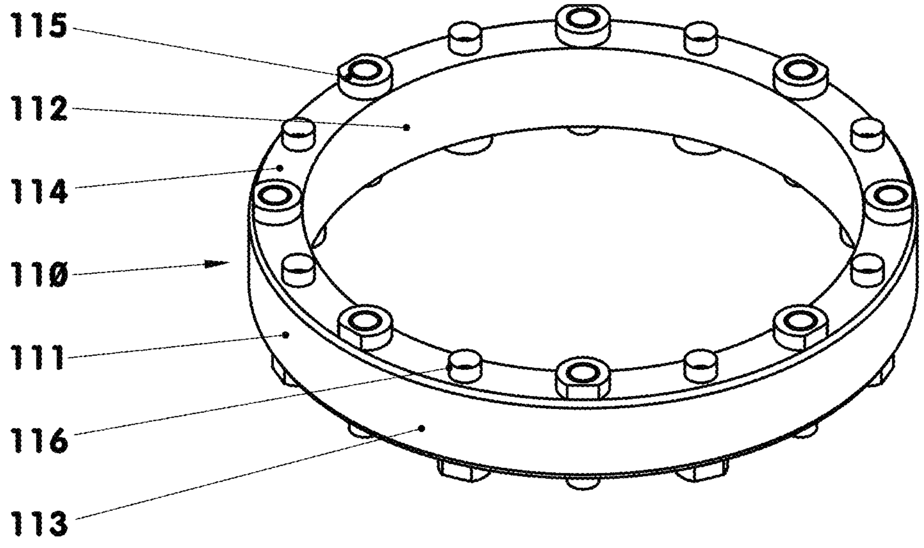
FIG. 14: Inner ring of the device according to FIG. 11.

FIG. 14 shows the inner ring (110) of this exemplary embodiment. When the braking and/or clamping device (10) is assembled, the inner ring (110) surrounds the inner wall (27) of the housing (21). The inner ring (110) is designed in the shape of a cylindrical jacket. Its outer surface (111) forms an inner piston guide area (113). Threaded inserts (115) are disposed on the end faces (114). If necessary, a spacer (116) can be disposed on the end face (114) of the inner ring (110), which end face faces away from the threaded insert (115).

Figure 15:
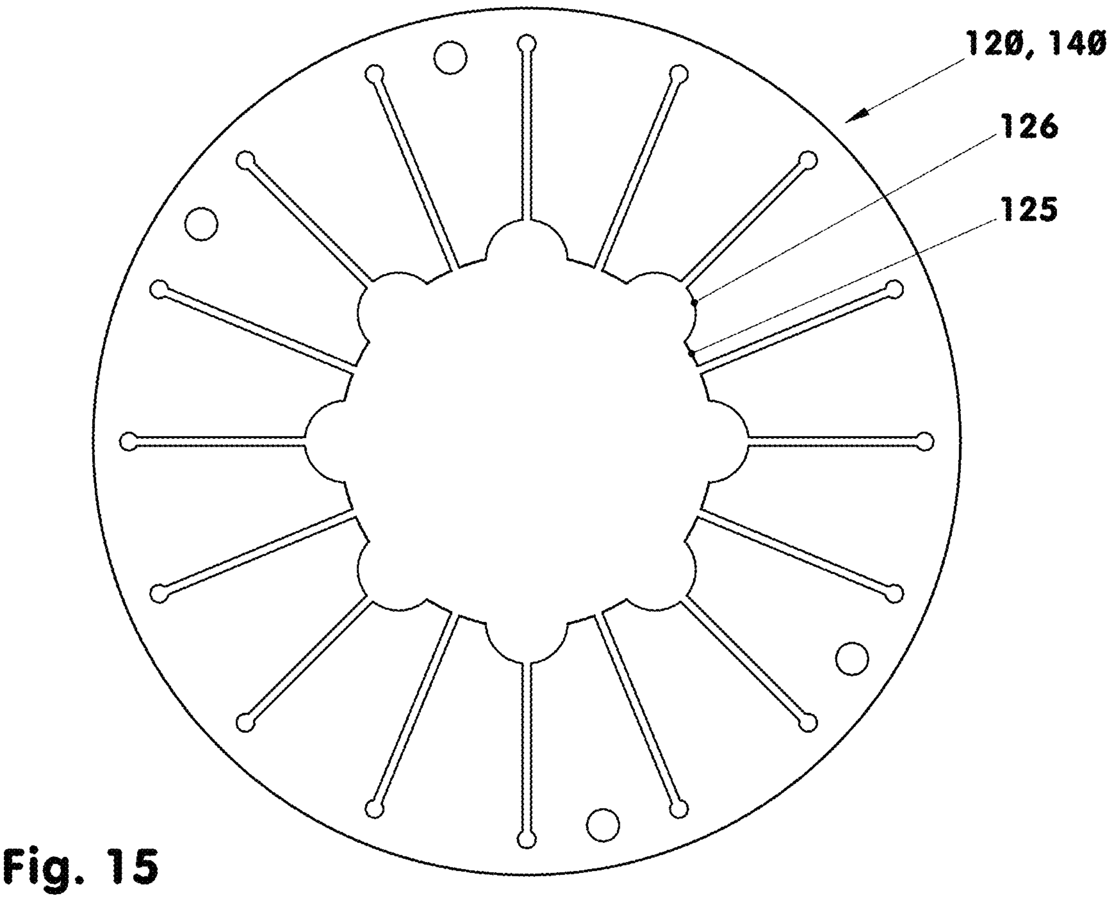
FIG. 15: Disc element of the device according to FIG. 11.

FIG. 15 shows a disc element (120; 140). The number of disc segments (121) of the individual disc element (120; 140) corresponds to twice the number of first clamping contact plates (81) or second clamping contact plates (41). The disc segments (121) have free surfaces (126) in the shape of a quarter circle. The arc length of the individual segment pressure zone (125) is, for example, 40% of a sector delimited by the disc segment (120; 140). In this exemplary embodiment also a plurality of disc elements (120; 140) can be disposed one above the other.

Figure 16:
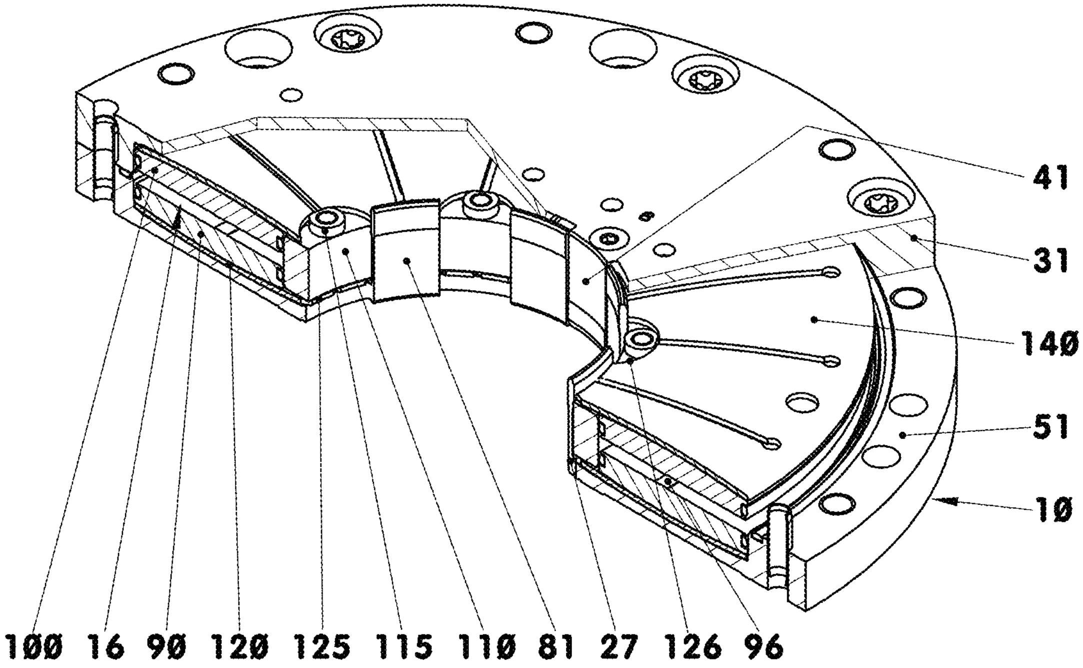
FIG. 16: Isometric sectional view of FIG. 11.

FIG. 16 shows an isometric sectional view of the braking and/or clamping device (10). In this illustration, the cover part (31) is broken out in some areas. In this exemplary embodiment also the first clamping contact plates (81) and the second clamping contact plates (41) form the inner wall (27) of the housing (21).

In the assembled braking and/or clamping device (10) of this exemplary embodiment, the first piston (90) and the first disc element (120) lie in the base part (51). The segment pressure zones (125) of the first disc element (120) are oriented in the direction of the second clamping contact plates (41). In the position shown, the first piston (90) places a load on the first disc element (120). The second clamping contact plates (41) projecting in the direction of the base part (51) are unloaded. For example, the segment pressure zones (125) are seated against the outer side of the clamping contact plates (41).

In the cover part (31), the second piston (100) places a load on the second disc element (140). The second piston (100) is sealed both at the outer wall (34) and at the inner ring (110). The first clamping contact plates (81) are unloaded. The first piston (90) and the second piston (100) also delimit the pressure chamber (16) in this exemplary embodiment.

In this exemplary embodiment, the inner ring (110) is screwed to both the cover part (31) and the base part (51). For this purpose, Allen screws (29), for example, are seated in the openings (36; 75) as fasteners (29). The inner ring (110) can also be unattached. For this purpose, the axial preload of the housing (21), for example, can be designed accordingly. The threaded inserts (115) are seated in the areas surrounded by the free surfaces (126).

Figure 11:
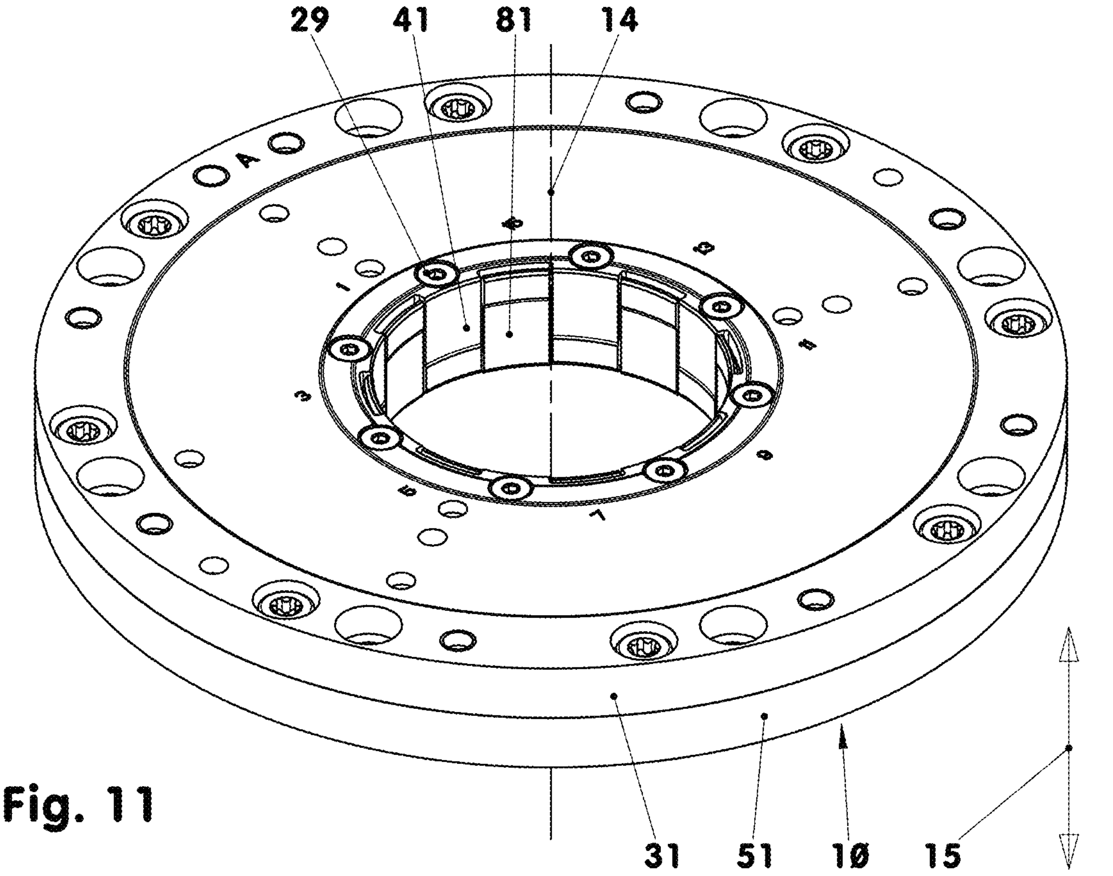
FIG. 11: Variant of a braking and/or clamping device.
Figure 12:
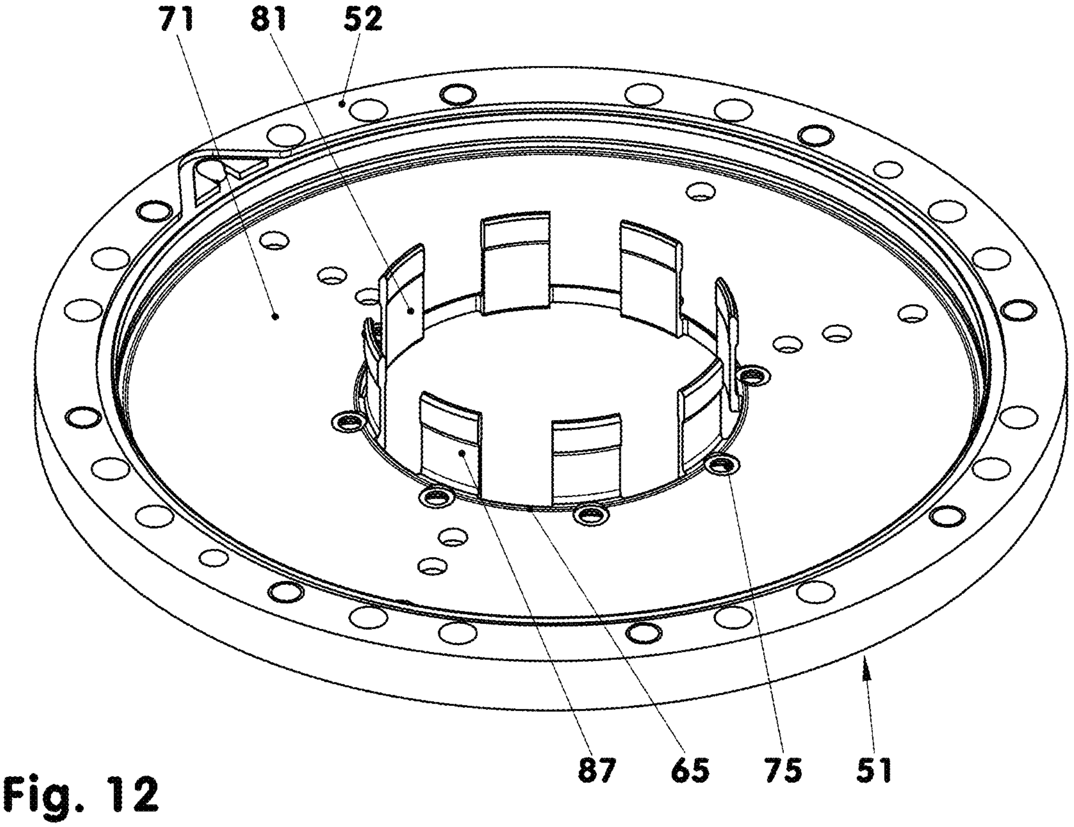
FIG. 12: Base part of the device according to FIG. 11.
Figure 13:
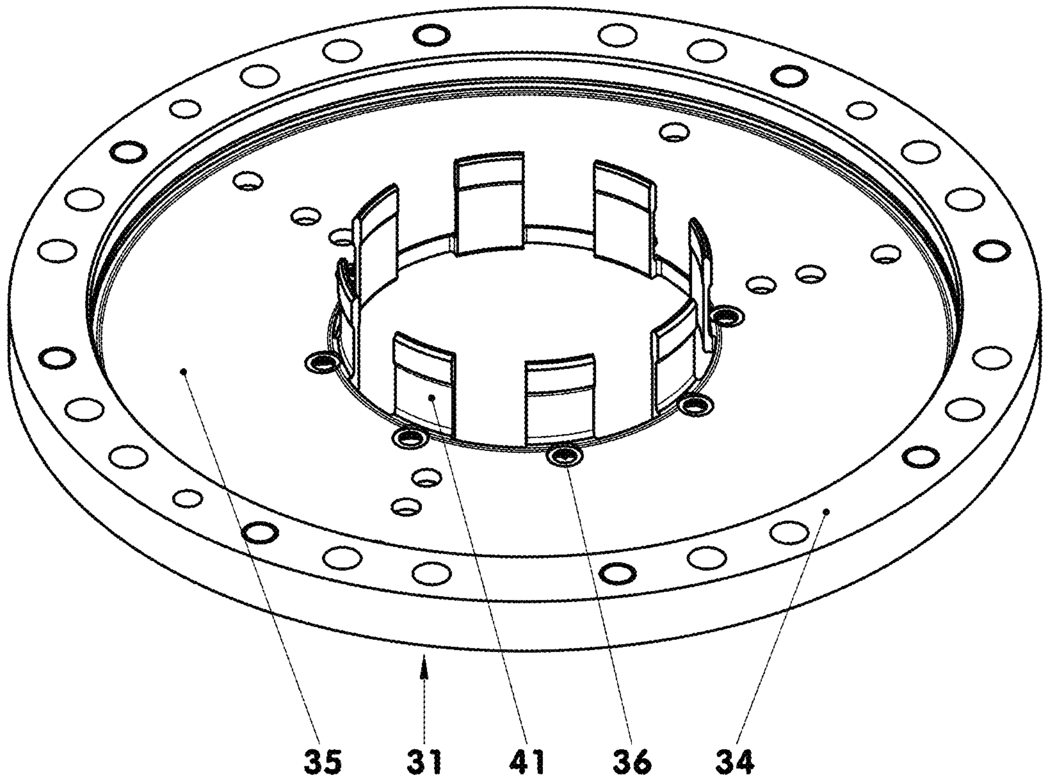
FIG. 13: Cover part of the device according to FIG. 11.
Figure 17:
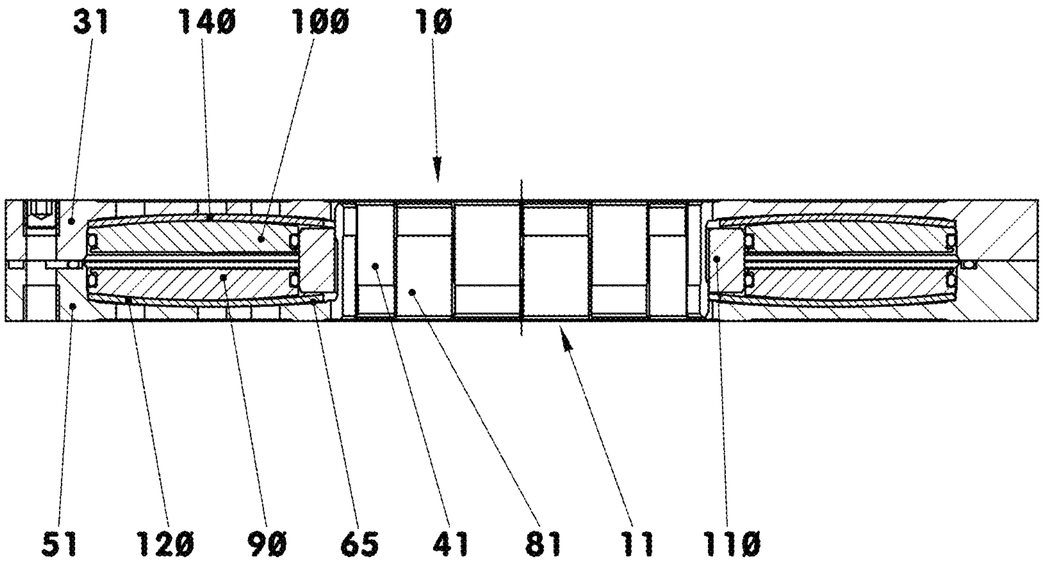
FIG. 17: Device according to FIG. 11 in released state.

FIG. 17 shows a cross section of the braking and/or clamping device (10) of FIG. 11 in the released position (11). The pressure chamber (16) is pressurized. The first piston (90) lies in its lower end position. The first disc element (120) is supported on the bottom part (51) on the outside in the disc receiving area (61) and on the inside at a disc element system (65). The first disc element (120) is deformed between these two counterholders (61, 65). The second clamping contact plates (41) are unloaded.

The second piston (100) lies in its upper end position. The deformed second disc element (140) has unloaded the first clamping contact plates (81). These clamping contact plates (81) are in their initial position shown in FIG. 12.

Figure 18:
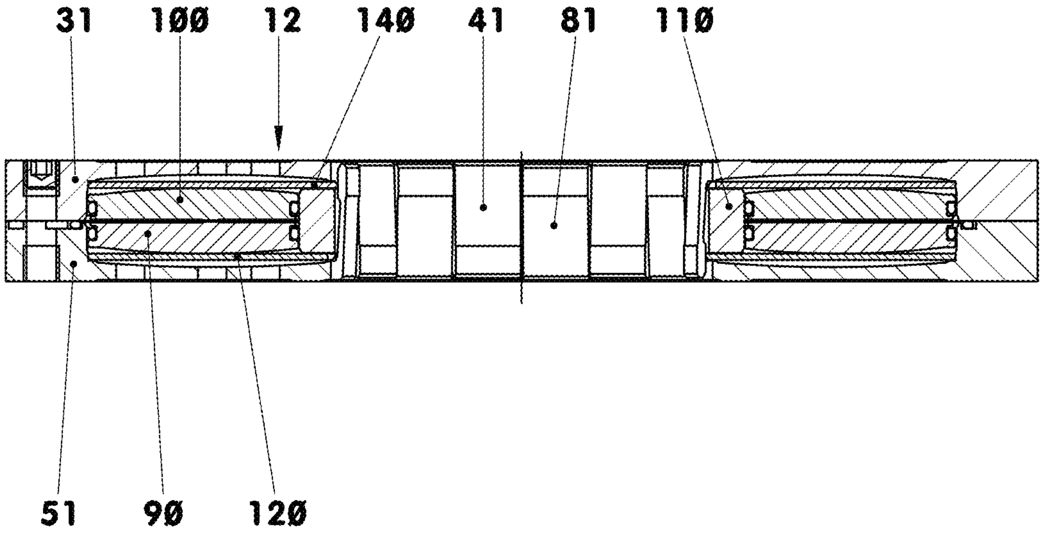
FIG. 18: Device according to FIG. 11 in clamping state.
Figure 19:
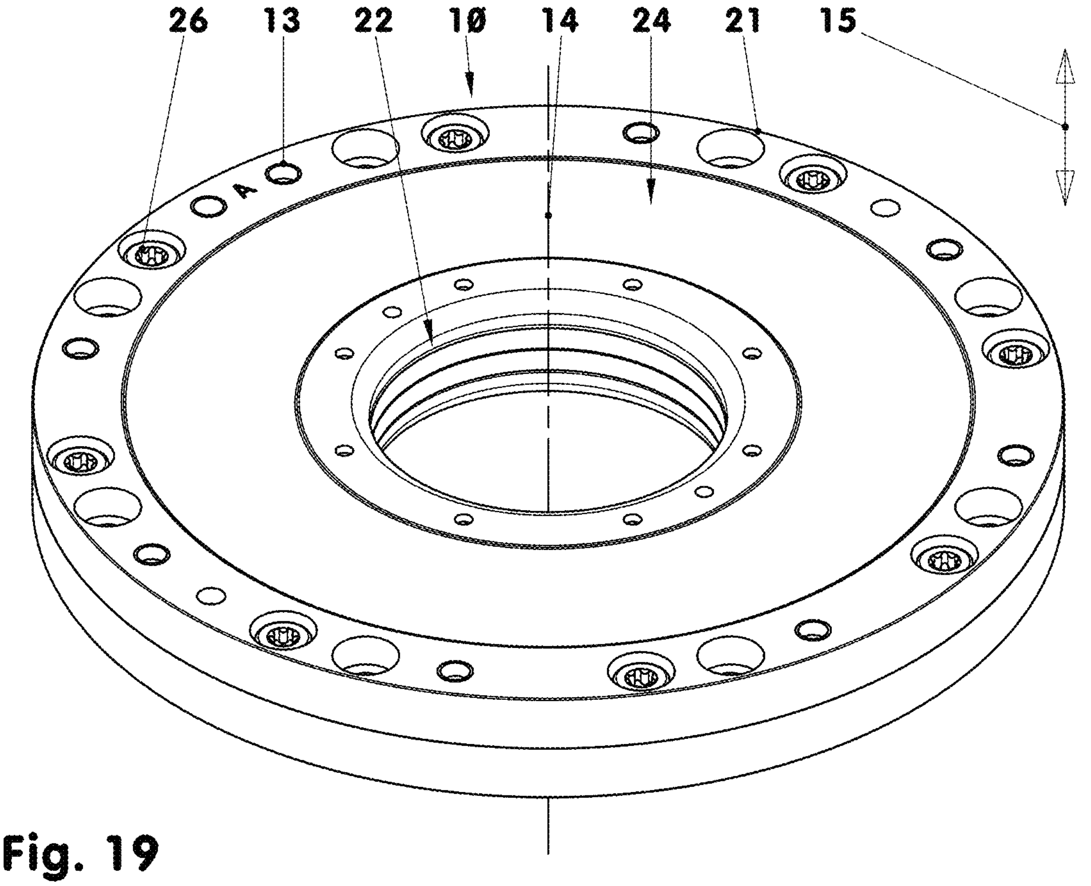
FIG. 19: Further variant of a braking and/or clamping device.

FIG. 18 shows this braking and/or clamping device (10) in the clamping position (12). The pressure chamber (16) is unloaded. Both pistons (90, 100) are moved in the direction of the separating joint (28) between the base part (51) and the cover part (31). The disc elements (120, 140) are unloaded and have elastically deformed back to their initial flat, for example, position. In doing so, they have elastically deformed the inner wall (27). All first clamping contact plates (81) as well as all second clamping contact plates (41) are deformed in the direction of the longitudinal axis (14). To disengage the clamping again, the pressure chamber (16) can be pressurized again with pneumatic pressure, for example.

If necessary, a further pressure chamber can be disposed between the first disc element (120) and the base (71) and/or between the second disc element (140) and the cover (35). This then has, for example, another piston that can be seated against the disc element (120; 140). This additional pressure chamber or these additional pressure chambers can then be pressurized inversely to the first pressure chamber (16), for example. This allows the individual disc element (120; 140) to be subjected to negative pressure in the first pressure chamber (16) and positive pressure in the other pressure chambers, for example, for fast-reaction clamping.

FIGS. 19 to 25 show a further variant of a braking and/or clamping device (10). This has the same outer dimensions as the braking and/or clamping devices (10) shown in the previous exemplary embodiments. A pneumatic connection (13), for example, is disposed on the top face (24) of the housing (21).

Figure 20:
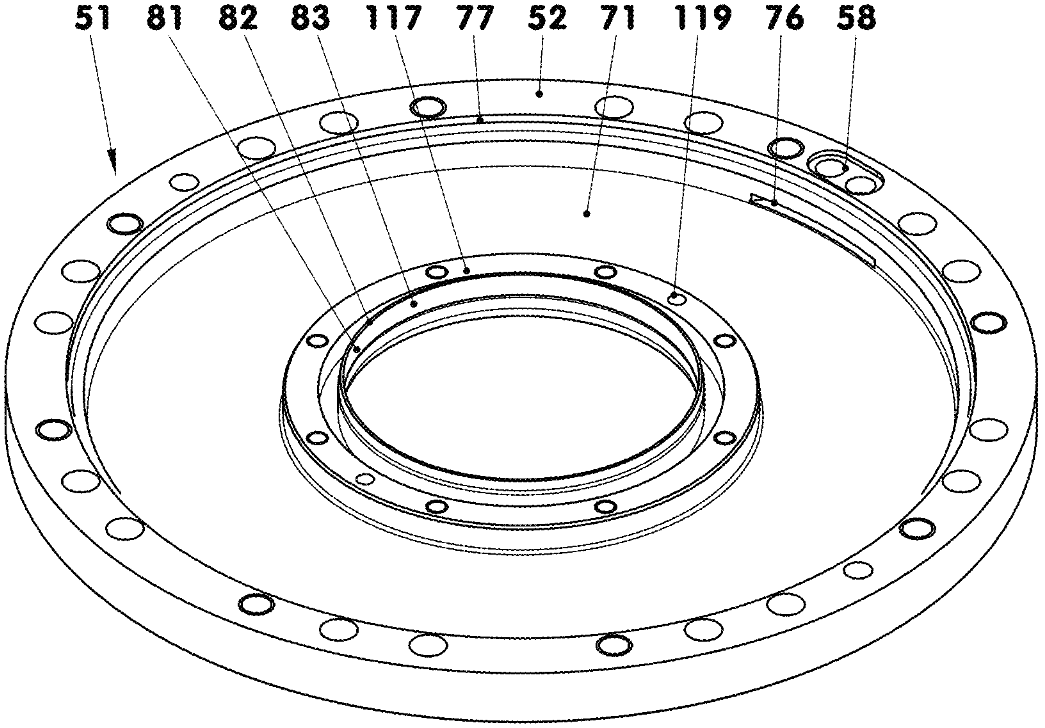
FIG. 20: Base part of the braking and/or clamping device from FIG. 19.
Figure 21:
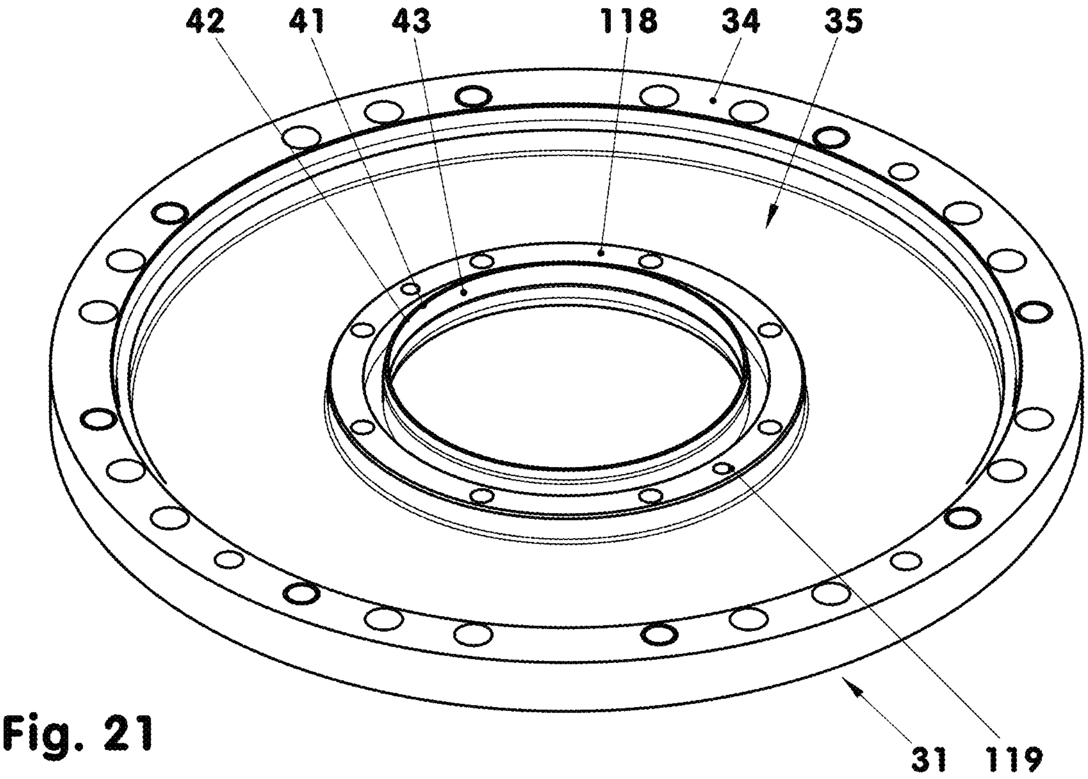
FIG. 21: Cover part of the braking and/or clamping device from FIG. 19.

The housing (21) has the base part (51) shown in FIG. 20 and the cover part (31) shown in FIG. 21. In the assembled braking and/or clamping device (10), the two parts are joined by means of the connecting screws (26). The pneumatic connection (13) opens into a two-part pressure chamber (16). A first pressure chamber area (17) lies in the base part (51) between the base (71) and the first piston (90) when the braking and/or clamping device (10) is mounted, see FIGS. 24 and 25. A second pressure chamber area (18) lies in the cover part (31) between the cover (35) and the second piston (100). The two pressure chamber areas (17, 18) are connected to one another by means of a connecting channel (19) disposed in the outer walls (34, 52). In the base part (51), the connecting channel (19) opens into a base nozzle (76) that widens in a delta shape. A geometrically identically formed cover nozzle (37), for example, is formed in the cover part (31).

In this exemplary embodiment, the inner ring (110) of the braking and/or clamping device (10) is formed in two parts. It has two support rings (117, 118) that are congruent with one another. A first support ring (117) is formed in the base part (51). For example, it is molded onto the base (71). However, the first support ring (117) can also be fastened to the base part (81). The second support ring (118) is formed or fastened in the cover part (31). The inside diameter of the individual support ring (117; 118) is 14% larger than the nominal diameter of the braking and/or clamping device (10). The outside diameter of the individual support ring (117; 118) in this exemplary embodiment is 34% larger than the nominal diameter of the braking and/or clamping device (10). The length of the individual support ring (117; 118) oriented in the longitudinal direction (15) is respectively 12.5% of the nominal diameter. The free end of the respective support ring (117; 118) is respectively chamfered on the outer side. In the illustrations in FIGS. 23 to 25, centering bolt receptacles (119) penetrate the inner ring (110).

The inner wall (27) of the braking and/or clamping device (10) has two inner wall portions (41; 81). Both inner wall portions (41, 81) are formed in an annular shape. A first inner wall portion (81) is part of the base part (51). A second inner wall portion (41) is part of the cover part (31). In this exemplary embodiment, the length of the individual inner wall portion (41; 81) oriented in the axial direction (15) is 16.8% of the nominal diameter. For example, a circumferential gap of 0.2 millimeters in length exists between the inner wall portion (41) on the cover side and the inner wall portion (81) on the base side. This gap is formed symmetrically to the separating joint (28), for example.

At its free end (42, 82), the respective inner wall portion (41; 81) has a clamping contact zone (43; 83). This is respectively formed in a ring shape. In this exemplary embodiment, the thickness of the respective inner wall portion (41, 81) in the area of the clamping contact zone (43; 83) is 1.5% of the nominal diameter. The respective clamping arm (44, 84) connects the clamping contact zone (43, 83) with the inner ring (110). In the exemplary embodiment, the transition is formed in the shape of an arch. The thickness of the inner wall portion (41; 81) in the area of the clamping arm (44, 84) is, for example, 81% of the thickness in the area of the clamping contact zone (43, 83).

On its outer side (47, 87), the respective inner wall portion (41, 81) has a contact chamfer (48, 88) at its free end (42, 82). This encloses an angle of 10 degrees with the clamping contact zone (43, 83). The contact chamfer (48, 88) transitions into the respective clamping arm (44, 84) in a rounding.

In this exemplary embodiment also the cylindrical areas of the outer surface (111) of the inner ring (110) form guide surfaces for the pistons (90, 100). The two pistons (90; 100) are formed as described in connection with the previous exemplary embodiments. They have an annular groove (93) on their inner surface (92) for receiving a sealing ring (108). With this sealing ring (108), the individual piston (90; 100) is seated against the outer surface (111) of the inner ring (110). On its jacket surface (95), each of the pistons (90, 100) has a sealing ring groove (94) for receiving an outer sealing ring (109). With this outer sealing ring (109), the individual piston (90; 100) is guided along the outer wall (34; 52).

The two pistons (90; 100) are disposed in the housing (21) in such a way that their projections (98) are oriented towards one another. The bottom face (91) of the piston (90) on the base part side is oriented in the direction of the base (71). The base nozzle (76) is aligned with the base (71). The bottom face (101) of the piston (100) on the cover side is oriented in the direction of the cover (35). The cover nozzle (37) is adjacent to the cover (35).

The disc elements (120, 140) are disposed between the two pistons (90, 100). The two disc elements (120, 140) are spaced apart from one another by means of two rings (151, 152). Both rings (151, 152) consist of the same material, for example. The material can be an elastomer, a metallic material, etc. They have the same circular, for example, cross-sectional area. In the exemplary embodiment, the thickness of the individual ring (151; 152) is three millimeters.

A first ring (151) is referred to below as the inner ring (151). Its mean diameter is, for example, 8% larger than the nominal diameter of the braking and/or clamping device (10). This ring (151) is located in an annular space (130), which is delimited by the inner wall (27) and the inner ring (110).

A second ring (152) is referred to below as the outer ring (152). In the exemplary embodiment, the mean diameter of the outer ring (152) is 2.5 times the nominal diameter. The outer ring (152) lies, for example, in a stepped recess (38, 77) in the outer walls (34, 52).

Figure 22:
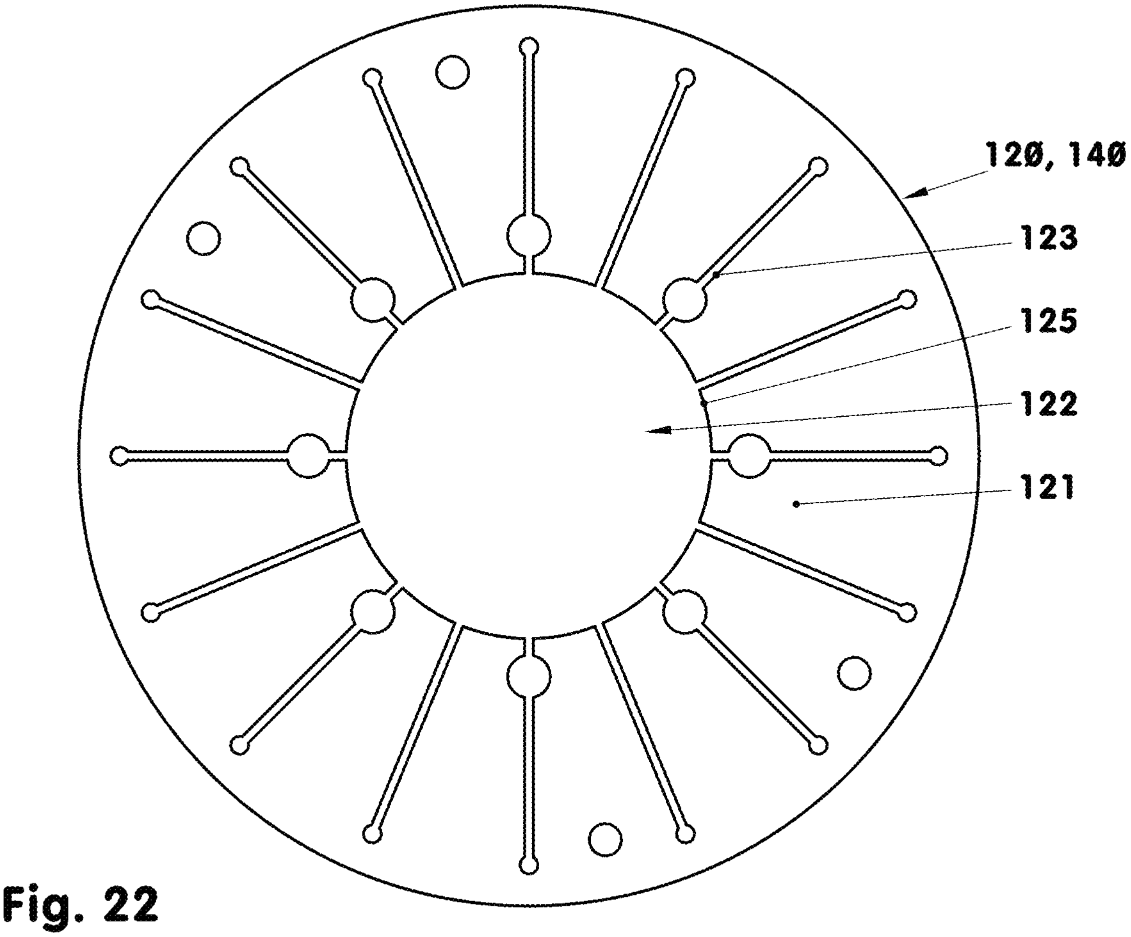
FIG. 22: Disc element.
Figure 23:
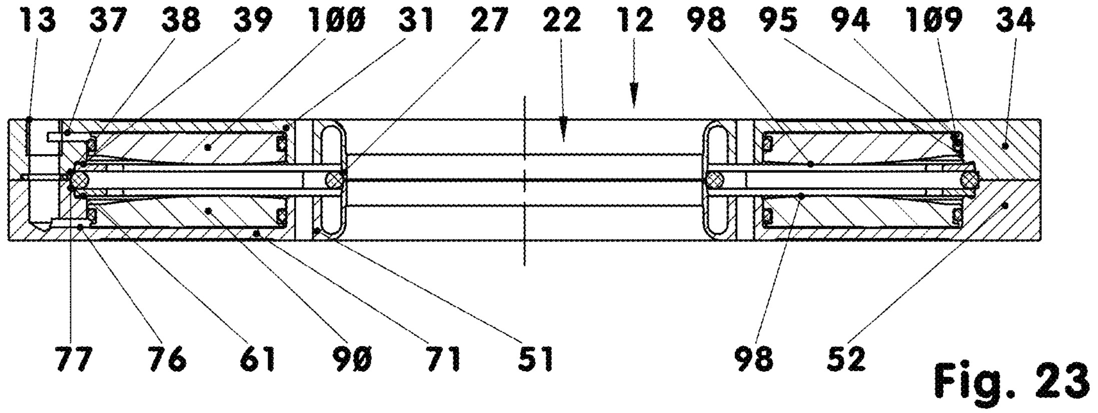
FIG. 23: Device of FIG. 19 in clamping state.
Figure 24:
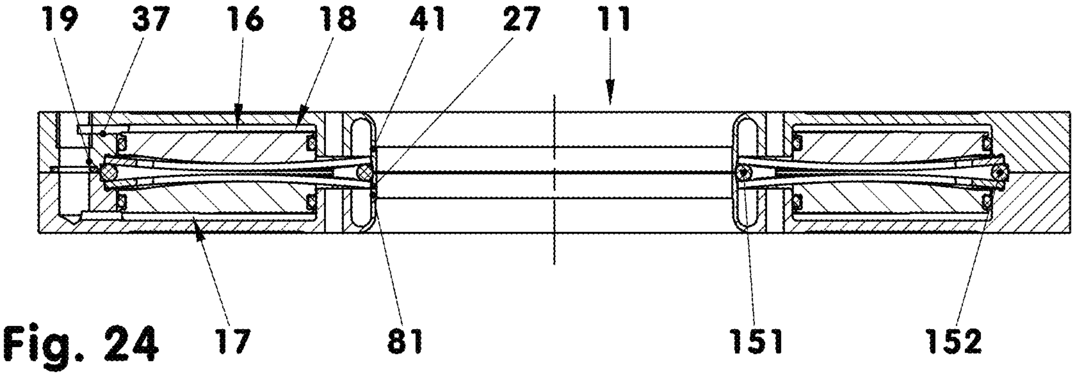
FIG. 24: Device of FIG. 19 in released state.
Figure 25:
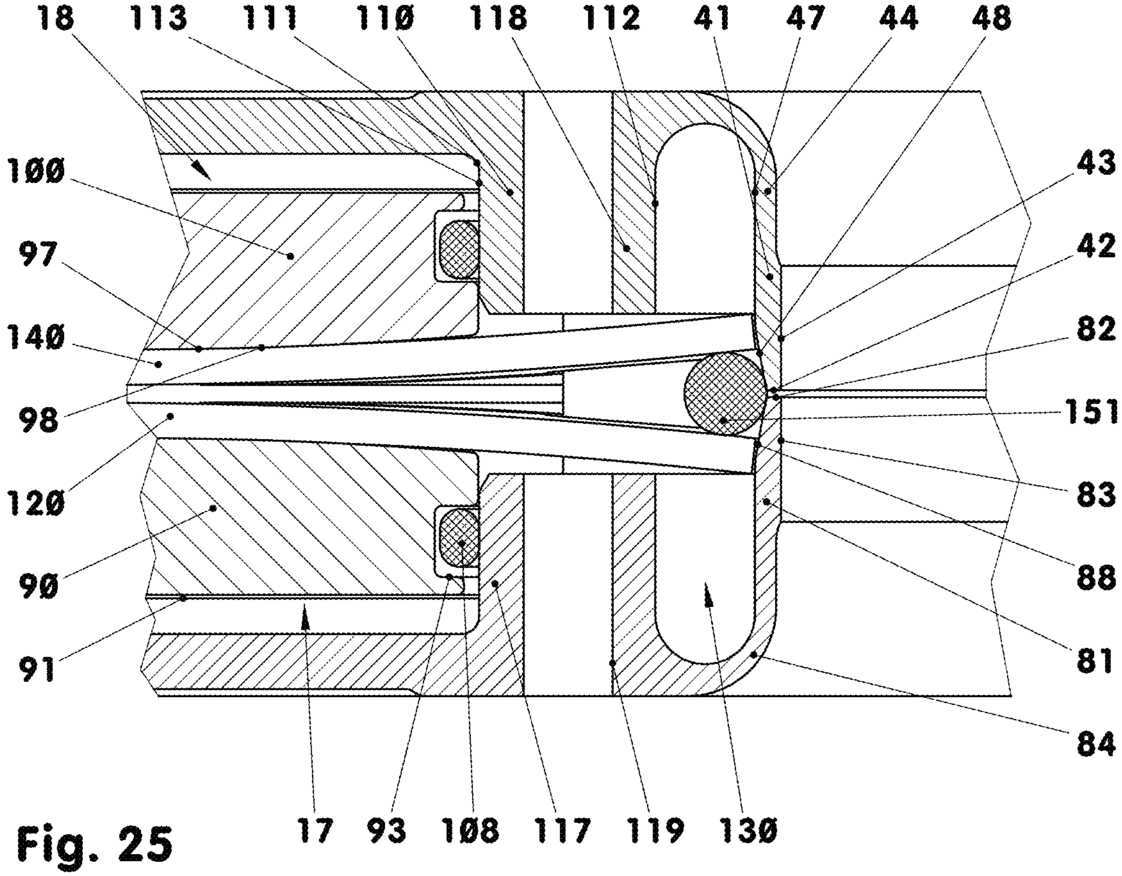
FIG. 25: Detail of FIG. 24.

FIG. 22 shows a disc element (120; 140) of this exemplary embodiment. The two disc elements (120; 140), for example, are formed identically. In the exemplary embodiment, they have a thickness of one millimeter. The outside diameter of the individual disc element (120; 140), for example, is 2.53 times the nominal diameter. The inside diameter of the undeformed disc element (120; 140) is 2.7% larger than the nominal diameter.

The individual disc element (120; 140) also has 16 disc segments (121), which are spaced apart from one another by means of radial slots (123). In this exemplary embodiment, the respective segment pressure zone (125) oriented centrally in the direction of the longitudinal axis (14) is formed without a free surface.

When assembling the braking and/or clamping device (10) shown in FIGS. 19 to 25, for example, the first piston (90) is first inserted into the base part (51) and the second piston (100) into the cover part (31), so that each piston top face (97) is visible. A disc element (120; 140) is then inserted into a disc support (39) and into the disc receiving area (61). The two rings (151, 152) are inserted before assembling the two sub-assemblies. Finally, the base part (51) is joined to the cover part (31). This exemplary embodiment can also be assembled in a different order. The braking and/or clamping device (10) is mounted on a rod as described in connection with the other exemplary embodiments.

When the pressure chamber (16) is not pressurized, the pistons (90, 100) lie in their end positions. For example, the lower piston (90) contacts the base (71) of the base part (51) with a circumferential ring (96), for example. The upper piston (100) is seated against the cover (35) of the cover part (31), e.g., with a circumferential ring (96). The two disc elements (120, 140) contact the piston top faces (97), for example. They lie parallel to one another in the housing (21), for example. Here, the disc elements (120, 140) exert a load on the inner wall portions (41, 81), which are elastically deformed radially inwards in the direction of the longitudinal axis (14). Here, the first disc element (120) presses on the respective first inner wall portion (81). The second disc element (140) places a load on the respective second inner wall portion (41). In this closed position, the braking and/or clamping device (10) clamps a rod received in the rod receptacle (22).

When the pressure chamber (16) is pressurized, the pneumatic pressure, for example, is built up both in the first pressure chamber area (17) and in the second pressure chamber area (18). The two pistons (90, 100) are moved towards one another relative to the housing (21) in the longitudinal direction (15). When the pistons (90, 100) are moved, each of the disc elements (120; 140) nestles against the adjacent piston (90; 100). The rings (151, 152) are under load. As the pistons (90, 100) are increasingly moved, the contact surface of the disc elements (120, 140) on the projection (98) of the respective piston (90, 100) increases. The respective inner wall portion (41, 81) is unloaded. The inner wall (27) deforms elastically back to its original position. In this exemplary embodiment, the deformation can also be supported by means of pressure on the piston top face (97) and/or negative pressure on the piston bottom face (91; 101).

The braking and/or clamping device shown in FIGS. 19 to 25 can also be formed with an individual piston (90; 100) and with an individual disc element (120; 140). It is also possible for a plurality of pistons (90; 100) to move in the same direction relative to the housing (21). Here, one or more disc elements (120; 140) can be used per piston (90; 100). The braking and/or clamping device (10) can also have an individual deformable inner wall portion (41; 81). However, a plurality of pistons (90; 100), disc elements (120; 140) and/or inner wall portions (41; 81) can also be used. Here, for example, at least one disc element (120; 140) and one piston (90; 100) are assigned to each deformable inner wall portion (41; 81).

Combinations of the individual exemplary embodiments are also conceivable.

REFERENCE SYMBOL LIST

10 Braking and/or clamping device
11 Released position, disengaged position
12 Clamping position
13 Connection, pneumatic connection
14 Longitudinal axis
15 Axial directions, longitudinal directions
16 Pressure chamber
17 First pressure chamber area
18 Second pressure chamber area
19 Connecting channel
21 Housing
22 Rod receptacle
23 Jacket surface of (21)
24 Top face, end face, cover part side
25 Bottom face, end face, bottom part side
26 Connecting screws
27 Inner wall
28 Separating joint
29 Allen screws, fasteners
31 Cover part
32 Edge part
33 Thread
34 Outer wall
35 Cover
36 Openings
37 Cover nozzle
38 Stepped recess
39 Disc support
41 Inner wall portions, second clamping contact plates
42 Free end of (41)
43 Clamping contact zone
44 Clamping arm
47 Outer side
48 Contact chamfer
51 Base part
52 Outer wall
53 Thread
54 Through bore

56 Centering bolt receptacles
57 Mounting bores
58 Distribution channel
59 Inner side
61 Disc receiving area, receiving groove
62 Transition area
63 Outer piston guide area
64 Inlet area
65 Disc element system, counterholder
71 Base
72 Circulating trough
73 Inner side of (71)
75 Openings
76 Base nozzle
77 Stepped recess
81 Inner wall portions, first clamping contact plates
82 Free end of (81)
83 Clamping contact zone
84 Clamping arm
85 Inner side of (81)
86 Insertion groove, counterholder
87 Outer side
88 Contact chamfer
90 Piston, first piston, annular piston
91 Bottom face of (90)
92 Inner surface
93 Annular groove
94 Sealing ring groove
95 Jacket surface
96 Circumferential ring
97 Piston top face
98 Projection
99 Apex of (98)
100 Piston, second piston, annular piston
101 Bottom face of (100)
108 Sealing ring
109 Outer sealing ring
110 Inner ring
111 Outer surface
112 Inner surface
113 Inner piston guide area
114 End faces
115 Threaded inserts
116 Spacer
117 Support ring
118 Support ring
119 Centering bolt receptacles
120 Disc element, first disc element
121 Disc segments
122 Central opening
123 Slots
124 Relief bore
125 Segment pressure zone
126 Free surface
127 Openings
128 Circumferential surface
130 Annular space
140 Disc element, second disc element
151 Ring, inner ring
152 Ring, outer ring

The invention claimed is:

1. A braking and/or clamping device (10), comprising an annular housing (21) which has at least one pneumatic or hydraulic connection (13) and surrounds a rod receptacle (22), wherein the rod receptacle (22) is oriented in an axial direction (15), wherein the annular housing (21) has a base part (51) and a cover part (31), wherein an annular pressure chamber (16) is disposed within the annular housing (21), wherein the annular pressure chamber (16) is delimited in the axial direction (15) by at least one piston (90; 100), wherein the at least one piston (90; 100) has a bulged piston top face (97) and is movable in the axial direction (15), wherein the annular pressure chamber (16) is delimited in a radial direction by outer walls (34, 52) of the housing (21) and by an inner ring (110) which surrounds an inner wall (27) of the housing (21), wherein the inner wall has an inner wall portion (41; 81), wherein a disc element (120; 140) is disposed in the housing (21) on the bulged piston top face (97), wherein the bulged piston top face (97) faces away from the annular pressure chamber (16) and is oriented in the axial direction (15), wherein the bulged piston top face (97) is or can be seated against or fastened to the disc element (120; 140), wherein the inner wall portion (41, 81) is protrudingly located in the cover part (31) or in the base part (51) of the housing (21), wherein the disc element (120; 140) is seated against the inner wall portion (41; 81) so that a load on the inner wall portion (41, 81) decreases with increasing deformation of the disc element (120; 140), wherein the load is directed radially towards the braking and/or clamping device (10), and wherein the braking and/or clamping device (10) is oriented in the axial direction (15).

2. The braking and/or clamping device (10) according to claim 1, wherein the piston (90; 100) is sealed at the outer walls (34, 52) and at the inner ring (110).

3. The braking and/or clamping device (10) according to claim 1, wherein at least two inversely operating pistons (90, 100) and at least two disc elements (120; 140) are disposed in the housing (21), and wherein each of the at least two inversely operating pistons (90; 100) is or can be seated against or fastened respectively to one of the at least two disc elements (120; 140).

4. The braking and/or clamping device (10) according to claim 1, wherein the inner ring (110) consists of two support rings (117, 118) which are congruent with one another, wherein a first of the two support rings (117) is formed or fastened in the cover part (31) and a second of the two support rings (118) is formed or fastened in the base part (51).

5. The braking and/or clamping device (10) according to claim 1, wherein the inner wall portion (41; 81) is part of a plurality of inner wall portions (41; 81) that are disposed along an annular line.

6. The braking and/or clamping device (10) according to claim 1, wherein the disc element (120; 140) is one of at least two disc elements (120; 140), wherein two rings (151, 152) are disposed between the disc elements (120; 140), wherein a first of the two rings (151) lies in an annular space (130) between the inner ring (110) and the inner wall (27) and wherein a second of the two rings (152) is seated against the outer walls (34, 52).

7. The braking and/or clamping device (10) according to claim 1, wherein the disc element (120; 140) in an unloaded state is a flat disc with radially oriented slots (123) adjacent to a central opening (122), and wherein a width of each of the radially oriented slots (123) is greater than a thickness of the disc element (120; 140).

8. The braking and/or clamping device (10) according to claim 1, wherein the piston (90; 100) has on its piston top face (97) a projection (98) disposed coaxially with an inner surface (92) and facing the disc element (120; 140).

9. The braking and/or clamping device (10) according to claim 1, wherein the inner wall portion (41; 81) has at least one clamping contact zone (43; 83) on its inner side (85).

10. The braking and/or clamping device (10) according to claim 1, wherein the inner ring (110) has an inner piston guide area (113) on its outer surface (111).

* * * * *